(12) United States Patent
Boni

(10) Patent No.: US 11,154,795 B2
(45) Date of Patent: Oct. 26, 2021

(54) USE OF COMPRESSED GAS FOR MOVING ELUENT APPLIED TO CHROMATOGRAPHY

(71) Applicant: NOVASEP EQUIPMENT SOLUTIONS, Pompey (FR)

(72) Inventor: Jérôme Boni, Metz Queuleu (FR)

(73) Assignee: NOVASEP EQUIPMENT SOLUTIONS, Pompey (FR)

( * ) Notice: Subject to any disclaimer, the term of this patent is extended or adjusted under 35 U.S.C. 154(b) by 223 days.

(21) Appl. No.: 16/340,041

(22) PCT Filed: Oct. 21, 2016

(86) PCT No.: PCT/FR2016/052725
§ 371 (c)(1),
(2) Date: Apr. 5, 2019

(87) PCT Pub. No.: WO2018/073500
PCT Pub. Date: Apr. 26, 2018

(65) Prior Publication Data
US 2020/0030718 A1 Jan. 30, 2020

(51) Int. Cl.
*B01D 15/20* (2006.01)
*B01D 15/40* (2006.01)
(Continued)

(52) U.S. Cl.
CPC .......... *B01D 15/203* (2013.01); *B01D 15/40* (2013.01); *B01D 15/424* (2013.01); *B01D 15/1821* (2013.01)

(58) Field of Classification Search
CPC .... B01D 15/203; B01D 15/40; B01D 15/424; B01D 15/1821
See application file for complete search history.

(56) References Cited

U.S. PATENT DOCUMENTS 4,122,094 A    10/1978  Woziwodzki
5,422,007 A *  6/1995   Nicoud .............. B01D 15/1842
                                                    210/659
(Continued)

FOREIGN PATENT DOCUMENTS

CN      1034367 B     8/1989
CN    101323607 A    12/2008
(Continued)

OTHER PUBLICATIONS

Grajek, H., "Regeneration of adsorbents by the use of liquid, subcritical and superctricial carbon dioxide", Adsorption Science & Technology, vol. 18, No. 4, pp. 347-370. (Year: 2000).*
(Continued)

*Primary Examiner* — Benjamin L Lebron
(74) *Attorney, Agent, or Firm* — Hamilton, Brook, Smith & Reynolds, P.C.

(57) ABSTRACT

The invention relates to a method for chromatographic separation, comprising at least one step of elution of species held on a stationary phase by means of an eluent, followed by a step of moving the eluent in contact with the stationary phase by means of a compressed gas. Preferably, the movement step takes place after a step of elution of the product(s) of interest and/or after a step of regeneration of the stationary phase.

19 Claims, 2 Drawing Sheets

(51) Int. Cl.
  *B01D 15/42*  (2006.01)
  *B01D 15/18*  (2006.01)

(56) References Cited

U.S. PATENT DOCUMENTS

| | | | |
|---|---|---|---|
| 6,072,092 | A | 6/2000 | Ooi et al. |
| 2007/0141720 | A1 | 6/2007 | Stewart et al. |
| 2011/0077388 | A1 | 3/2011 | Hwang et al. |
| 2013/0323138 | A1 | 12/2013 | Demmitt |

FOREIGN PATENT DOCUMENTS

| | | |
|---|---|---|
| CN | 103288571 A | 9/2013 |
| EP | 0242148 A2 | 10/1987 |
| EP | 1083174 A1 | 3/2001 |
| EP | 1097985 A1 | 5/2001 |
| EP | 1122250 A1 | 8/2001 |
| EP | 1424013 A1 | 6/2004 |
| FR | 2527934 A1 | 12/1983 |
| GB | 2218989 A | 11/1989 |
| IN | 333/DEL/2005 | 8/2007 |
| JP | H01160953 A | 6/1989 |
| WO | 94/08987 A1 | 4/1994 |
| WO | 03/037884 A2 | 5/2003 |
| WO | 2007/090545 A1 | 8/2007 |
| WO | 2008025895 A1 | 3/2008 |
| WO | 2014/100327 A1 | 6/2014 |

OTHER PUBLICATIONS

International Search Report dated Jun. 23, 2017 re International Application No. PCT/FR2016/052725 entitled "Use of Compressed Gas for Moving Eluent Applied to Chromatography," filed Oct. 21, 2016.
8.9—Flash Column Chromatography Guide, MIT OpenCourseWare, pp. 1-6, Jan. 2012.

\* cited by examiner

USE OF COMPRESSED GAS FOR MOVING ELUENT APPLIED TO CHROMATOGRAPHY

This application is the U.S. National Stage of International Application No. PCT/FR2016/052725, filed Oct. 21, 2016, which designates the U.S., published in French. The entire teaching of the above application is incorporated herein by reference.

FIELD OF THE INVENTION

The present invention relates to a chromatographic separation method including a step of displacing an eluent by a compressed gas such as $CO_2$. The invention also relates to an installation adapted to the implementation of this method.

TECHNICAL BACKGROUND

Many documents of the prior art describe chromatographic separation methods, notably of hydrophobic products, either in liquid chromatography or in supercritical chromatography.

In liquid chromatography, products such as squalenes, carotenoids and vitamin E, and many other products are separated by a succession of elution steps. The requirements for high yield and high purity leads to the use of several eluents. As a result, solutions at the output of chromatography comprise mixtures of eluents which must be recovered and dissociated by distillation.

Thus, document CN 103288571 discloses the separation of squalene by high performance liquid chromatography (HPLC) on a silica gel by means of a first elution with an eluent such as n-hexane, followed by a second elution with an eluent comprising a mixture such as n-hexane and cyclohexane in volume ratios such as 5-20:1.

Document U.S. Pat. No. 6,072,092 discloses the separation of tocopherols and tocotrienols by HPLC on a silica gel by means of a first elution with a non-polar solution followed by a second elution with a polar solution, or a mixture of polar and non-polar solutions.

Document WO 2014/100327 discloses the separation of isomers of tocotrienol by HPLC on a silica gel; wherein two elutions are carried out with a mixture of non-polar solutions having a low polar solution content.

Document CN 101323607 discloses the separation of tocopherols by HPLC in three successive elutions.

An elution method comprising mixtures of solutions is also described in document EP 242148 presenting the extraction of carotenes with an elution solution comprising a majority of polar solution and a minority of non-polar solution.

Document CN 1013197 discloses the separation of tocopherols with a simple elution with a mixture of non-polar solution and a low ratio of polar solution. The same applies to the documents WO 94/08987 and EP 1424013 which describe the separation of carotenes, and the document WO 2003/37884 for the extraction of tocopherols.

A simple elution of the product by means of a single non-polar solution is described in documents JP 2547595 and U.S. Pat. No. 4,122,094 for the separation of carotenes and tocopherols.

The prior art described above relates to the normal phase HPLC pathway. Documents GB 8729232 and EP 1083174 disclose reverse phase separation methods, wherein the adsorption of the product or impurities on the chromatographic medium is carried out via hydrophobic type bonds.

For the separation in supercritical chromatography, the elution of the product is carried out by means of a solution of $CO_2$ and/or non-polar solution. Documents EP 1122250, EP 1097985 and IN 2005DE00333 propose the application of this method for the separation of carotenes and/or vitamin E derivatives that are derived from palm oil or palm oil derivatives. The support is of ungrafted silica type or C18 type, and the separation of the product of interest and the impurities is carried out using a temperature and/or pressure gradient during the elution step. Document WO 2007/90545 proposes the use of gas in the supercritical state for a two-step method, in which a palm oil derivative previously concentrated in the product of interest (vitamins E or carotenes) is extracted by a supercritical fluid in continuous mode (step 1) and then purified by a chromatographic method with desorption controlled by supercritical $CO_2$ in the case of vitamin E derivatives, and by supercritical propane in the case of carotenes.

In general, separation on a chromatography column, notably for obtaining the above non-polar compounds, is based on a series of steps, wherein a typical sequence is detailed below:

Step 1: equilibration. The separation matrix, also called the stationary phase, is equilibrated by an eluent having a low affinity for the matrix. The nature of the eluent may be identical to that of the eluent used during the elution step. This step makes the adsorption sites of the phase available.

Step 2: injection of the product. The product to be separated is injected into the medium. During the injection, depending on the solvent used in the injection solution, the product may remain adsorbed on the support or be driven along the column. Similarly impurities may be driven or not depending on their affinity for the stationary phase.

Step 3 (optional): elution of impurities having low affinity for the stationary phase. In this step, also called rinsing, some impurities with low affinity for the stationary phase are eluted with an eluent also having low affinity for the stationary phase. This rinsing eluent may be identical to that used in the equilibration step or the elution step of the product.

Step 4: elution of the product. The product to be separated is desorbed by an eluent which may be identical to that used in the injection phase or in the equilibration phase, or have higher affinity for the stationary phase.

Step 5 (optional): cleaning or regeneration. Another eluent with higher affinity for the stationary phase is then introduced into the column in order to remove the non-eluted impurities by one of the solvents of steps 2, 3 or 4 because they are strongly bound to the stationary phase.

One of the limitations of this sequential separation method, used for analytical or preparative purposes, appears when at least two cycles are applied consecutively, and one passes from step 4 or optionally 5 to step 1. In fact, during this transition, an eluent whose affinity for the stationary phase is low is used in order to displace an eluent whose affinity for the stationary phase is strong. Large volumes of equilibration eluent are required to completely displace the washing eluent, thus the column equilibration times are long, and the solvent consumption is significant.

Another disadvantage of this method, when applied at the production scale, is related to the difficulty of recycling the solvents used in the mobile phase. In fact, when a solvent in one chromatography column is displaced by another, it is a mixture of these two solvents that is first found at the column outlet, until all the solvent molecules to be replaced are completely desorbed, as shown in FIG. 1.

The duration of this re-equilibration phase has a negative impact on productivity, and the volume of this interface between regeneration solvent and equilibration solvent impacts the cost of the separation: either this interface is eliminated or the solvents of this solvent mixture must be purified by distillation before being used again because the residual contents of regeneration solvent in the elution solvent have to be very low to avoid changing the elution of the different products in the successive cycles. These solvent recycling difficulties are all the more significant as the affinity of the product to be separated for the stationary phase is low (elution step) and the affinity of the highly adsorbed impurities is high (regeneration step). In fact, in this case, the differences in elution strength between the solvents are more significant, and the residual contents of washing solvent that can be accepted in the recycled solvent for equilibration, injection or elution should be even lower in order to avoid too rapid elution of the poorly retained product and also to avoid its co-elution with impurities supposed to be more retained.

In conclusion, this method requires large volumes of eluent with a very high purity, and a distillation step is necessary to separate the various eluents before recycling and thus avoid a very high consumption of solvents.

There is therefore a real need to develop a chromatographic separation method wherein the displacement of a solvent by another in a chromatography column is facilitated, notably when the solvent to be displaced is of greater affinity for the support than the solvent that is used for its displacement.

There is also interest in developing a method allowing to avoid mixing of the solvents used in the column, in order to facilitate their recycling.

SUMMARY OF THE INVENTION

The invention relates firstly to a chromatographic separation method, comprising at least one step of eluting species retained on a stationary phase by means of an eluent, followed by a step of displacing the eluent in contact with the stationary phase by means of a compressed gas.

According to one embodiment, the compressed gas is in the liquid state.

According to one embodiment, the compressed gas is in the supercritical state.

According to one embodiment, the compressed gas is $CO_2$.

According to one embodiment, the absolute pressure of the compressed gas used for the displacement step is less than or equal to 300 bar, preferably 200 bar, preferably 150 bar, preferably 100 bar, preferably 75 bar, more preferably 50 bar.

According to one embodiment, the eluent is a single compound.

According to one embodiment, the eluent is a mixture of at least two compounds.

According to one embodiment, the eluent is an aqueous and/or organic solvent or a mixture of aqueous and/or organic solvents.

According to one embodiment, the eluent is a mixture of aqueous and/or organic solvent(s) and compressed gas, preferably $CO_2$ in the liquid or supercritical state.

According to one embodiment, the method comprises, after the step of displacing the eluent, the collection of a mixture of compressed gas and aqueous and/or organic solvent(s) at the output of the stationary phase, and the separation of the compressed gas and the aqueous and/or organic solvent(s).

According to one embodiment, the aqueous and/or organic solvent(s) are recycled discontinuously.

According to one embodiment, the aqueous and/or organic solvent(s) are recycled continuously.

According to one embodiment, the aqueous and/or organic solvent(s) are recycled to more than 50%, preferably 60%, preferably 70%, preferably 80%, preferably 90%, preferably 99%, by weight.

According to one embodiment, the compressed gas is recycled discontinuously.

According to one embodiment, the compressed gas is recycled continuously.

According to one embodiment, the compressed gas is recycled to more than 50%, preferably 60%, preferably 70%, preferably 80%, preferably 90%, preferably 95%, preferably 99%, by weight.

According to one embodiment, said step of eluting species retained on a stationary phase by means of an eluent is an elution step of product(s) of interest.

According to one embodiment, said step of eluting species retained on a stationary phase by means of an eluent is a regeneration step of the stationary phase.

According to one embodiment, said eluent is a first eluent, wherein the method comprises, after the step of displacing the eluent by means of a compressed gas, bringing a second eluent into contact with the stationary phase, which is preferably different from the first eluent.

According to one embodiment, bringing a second eluent into contact with the stationary phase is a regeneration step of the stationary phase.

According to one embodiment, bringing a second eluent into contact with the stationary phase is an equilibration step.

According to one embodiment, the method comprises cyclically:
- an equilibration step, comprising bringing an equilibration eluent into contact with the stationary phase;
- an injection step comprising bringing a composition comprising a product to be separated into contact with the stationary phase;
- an optional rinsing step, comprising bringing a rinsing eluent into contact with the stationary phase;
- a step of eluting the product, comprising bringing an eluting eluent into contact with the stationary phase and collecting the product to be separated;
- again, the equilibration step;

wherein the step of displacing the eluent in contact with the stationary phase by means of a compressed gas is carried out between the product elution step and the equilibration step.

According to one embodiment, the method comprises successively or cyclically:
- an equilibration step, comprising bringing an equilibration eluent into contact with the stationary phase;
- an injection step comprising bringing a composition comprising a product to be separated into contact with the stationary phase;
- an optional rinsing step, comprising bringing a rinsing eluent into contact with the stationary phase;
- a step of eluting the product, comprising bringing an eluting eluent into contact with the stationary phase and collecting the product to be separated;
- a regeneration step, comprising bringing a regeneration eluent into contact with the stationary phase;

if applicable, the equilibration step again;

wherein the method comprises at least one step of displacing an eluent in contact with the stationary phase by means of a compressed gas between the product elution step and the regeneration step; and/or between the regeneration step and the equilibration step.

According to one embodiment, the method comprises both a displacement step of the eluent in contact with the stationary phase by means of a compressed gas between the product elution step and the regeneration step, and another displacement step of the eluent in contact with the stationary phase by means of a compressed gas between the regeneration step and the equilibration step.

According to one embodiment, the equilibration, injection, optional rinsing, elution and, if applicable, regeneration steps are carried out with eluents comprising a compressed gas.

According to one embodiment, the equilibration, injection, optional rinsing, elution and, if applicable, regeneration steps are carried out with eluents not comprising compressed gas.

According to one embodiment, the stationary phase is a normal phase.

According to one embodiment, the stationary phase is an inverse phase.

According to one embodiment, the stationary phase is a phase of intermediate polarity.

According to one embodiment, the stationary phase is a chiral phase.

According to one embodiment, the stationary phase comprises at least one material selected from activated alumina, silica gel, activated charcoal, silicic acid, magnesium oxide, calcium hydroxide, magnesium hydroxide, cellulose, amylose, a polymerized adsorbent, a derivative thereof, and/or combinations thereof.

According to one embodiment, the method is a preparative chromatographic separation method.

According to one embodiment, the method is an analytical chromatographic separation method.

According to one embodiment, the method is for the purification of natural extracts.

According to one embodiment, the method is for the purification of carotenes.

According to one embodiment, the method is for the purification of squalenes.

According to one embodiment, the method is for the purification of vitamins.

According to one embodiment, the method is for the purification of peptides.

According to one embodiment, the method is for the purification of insulin, preferably of recombinant insulin or insulin derivative.

The invention also relates to an installation for implementing the above method, comprising:
at least one enclosure containing a stationary phase;
a supply of the enclosure with at least one eluent; and
a supply of the enclosure with compressed gas.

According to one embodiment, the enclosure is a chromatographic column.

According to one embodiment, the installation further comprises a supply of the enclosure with at least one other eluent.

According to one embodiment, the installation comprises a device for separating compressed gas and solvent(s) at the outlet of the enclosure.

The present invention allows to overcome the disadvantages of the prior art. More particularly, it provides a chromatographic separation method wherein injections of successive eluents on the same stationary phase are facilitated and/or accelerated, the consumption of eluents is minimized and the recycling of the eluents is facilitated.

This is accomplished through the use of a compressed gas, such as compressed $CO_2$, to displace an eluent in contact with the stationary phase, prior to the injection of the successive eluent.

Thus, the invention avoids collecting at the outlet of the stationary phase mixtures of eluents of a different nature: a mixture of compressed gas and eluent of a single step is recovered at the outlet. The recycling of the eluents is then possible without intermediate distillation, for example by simply using filtration or flash evaporation at reduced pressure, for example in cyclonic separators.

The high diffusivity of the compressed gas (such as compressed $CO_2$) may very substantially improve the regeneration step of the stationary phase, and more specifically the desorption of the impurities. This same property of diffusivity is likely to substantially improve the equilibration step of the stationary phase, since the regeneration solvent with high affinity for the stationary phase will have already been desorbed by the compressed gas. The volumes of eluents required for equilibration are thus lower, thus reducing the time between two successive injections (or cycle time), and thus increasing productivity.

The invention allows an excellent stability of the operating conditions and thus better reproducibility of the tests.

These advantages in terms of reducing operating time and decreasing eluent consumption have a very interesting range for preparative chromatography as well as for analytical chromatography.

DESCRIPTION OF EMBODIMENTS OF THE INVENTION

Figure 1:
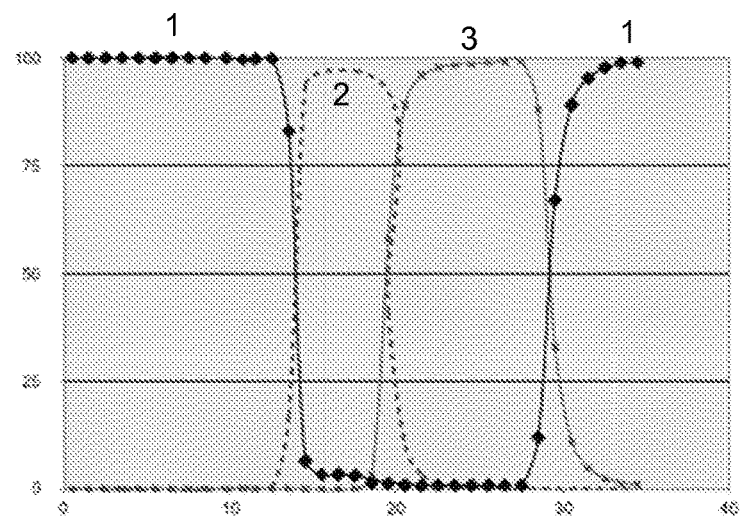
FIG. 1 shows the drawbacks of the prior art, by showing the evolution of the concentration of different solvents at the outlet of a chromatography column of 50 mm internal diameter, filled with a non-grafted silica stationary phase. The elution time in minutes is shown on the abscissa, and the solvent content in % is shown on the ordinate. Initially, the column filled with hexane (solvent 1). At t=10 minutes, the injection of acetone at 100% by weight (solvent 2) is initiated. At t=15 minutes, the injection of dichloromethane at 100% by weight (solvent 3) is initiated. At t=25 minutes, the injection of hexane at 100% by weight is again initiated (solvent 1).

The invention is now described in more detail and without limitation in the description which follows.

In its most general form, the invention relates to a chromatographic separation method, wherein a step of eluting species retained on a stationary phase by means of an eluent is followed by a step of displacing the eluent in contact with the stationary phase by means of a compressed gas.

By "eluent" is meant a fluid capable of desorbing species retained on a stationary phase, whether they are species of interest or impurities.

An eluent may be a pure solvent or a mixture of solvents. Each solvent may be, notably, aqueous or organic, or even a gas in the liquid or supercritical state or close to the supercritical state.

Organic compounds which may be used as solvents are, in particular, alkanes, alcohols, ethers, esters, ketones and nitriles.

The alkanes are preferably C1-C10, more preferably C6-C8. They may be linear or branched, and preferably linear. Hexane and heptane are preferred examples.

The alcohols are preferably of the formula R—OH where R is a C1-C6 alkyl group. They include methanol, ethanol, n-propanol, i-propanol, n-butanol, i-butanol, s-butanol and t-butanol.

The ethers are preferably of the formula R—O—R', where R and R' are C1-C6 alkyl groups. They include diethyl ether, diisopropyl ether, and methyl t-butyl ether (MTBE).

The ethers are preferably of formula R—(C=O)O—R', where R and R' are C1-C6 alkyl groups. They include methyl acetate and ethyl acetate.

The ketones are preferably of formula R—(C=O)—R', where R and R' are C1-C6 alkyl groups. They include acetone, methyl ethyl ketone and methyl isobutyl ketone (MIBK).

The nitriles are preferably of formula R—CN, where R is a C1-C6 alkyl group. They include acetonitrile.

By "compressed gas" is meant a fluid which is in the gaseous state under normal conditions of temperature and pressure (i.e. 0° C. and 1 bar absolute), but which is used in the method of the invention at a pressure above the pressure of 1 bar absolute.

According to particular embodiments, the compressed gas is used at a pressure greater than or equal to 2, 3, 4, 5, 10, 15, 20, 25, 30, 35, 40, 45 or 50 bar absolute.

In order to simplify the implementation of the method, it may be advantageous that the pressure of the compressed gas used for the displacement step is less than or equal to 300 bar, preferably 200 bar, preferably 150 bar, preferably 100 bar, preferably 75 bar, and more preferably 50 absolute.

The compressed gas may be in the gaseous state when used in the method of the invention for carrying out the eluent displacement step. However, preferably, it is in the liquid or supercritical state.

As examples of compressed gases, mention may be made of carbon dioxide ($CO_2$), propane and nitrous oxide. $CO_2$ is preferred. It has the particular advantage of presenting a critical point at near-ambient temperature (31° C.) and at moderate pressure (73 bar). It is also already widely used as an eluent in chromatography in liquid or supercritical phase, pure or mixed with other solvents.

The chromatographic separation according to the invention may be a liquid chromatographic separation, in which case the eluents used are liquid solvents as described above, preferably aqueous and/or organic.

Alternatively, it may be a chromatography with liquid expanded by a gas, in which case the eluents used are mixtures of solvent or liquid solvents (preferably organic) as described above, and compressed gas, wherein the liquid solvent(s) are predominant by weight.

Alternatively, it may be a supercritical chromatography, in which case the eluents used are either one or more compressed gas(es) alone, or one or more mixtures of compressed gas and one or more liquid solvents (preferably organic) wherein the compressed gas is predominant by weight.

However, it should be understood that the compressed gas used during the eluent displacement step is different from the eluent itself, even when this eluent is also a compressed gas.

The method of the invention may comprise, notably, successively or cyclically:
an equilibration step;
a step of injecting a composition containing at least one product to be separated (or purified);
an optional rinsing step;
a step of eluting the product;
an optional regeneration step;
again the equilibration step if the method is implemented cyclically.

One or more eluents, as defined above, are used at each of these steps and brought into contact with the stationary phase.

According to one embodiment, the equilibration eluent and the eluting eluent are identical.

According to one embodiment, the rinsing eluent and the eluting eluent are identical.

According to one embodiment, the equilibration eluent and the rinsing eluent are identical.

The optional rinsing step intends to desorb from the stationary phase species having an affinity for the stationary phase lower than that of the product to be separated.

The optional regeneration step intends to desorb from the stationary phase species having an affinity for the stationary phase higher than that of the product to be separated.

Preferably, the regeneration eluent is different from the eluting eluent. Advantageously, it has a higher affinity for the stationary phase than the eluting eluent.

At each step where an eluent is used, an eluent of constant composition may be used (elution in isocratic mode, wherein the eluting force remains constant over time).

Alternatively, it is possible to use an eluent of composition varying over time, for example two or three successive different eluents, or an eluent having a composition that varies continuously (elution in gradient mode, wherein the eluting force then generally increases over time). To do this, it is, for example, possible to gradually increase the proportion of the most eluent solvent in a mixture containing at least two solvents.

In the context of the succession of steps described above, the method of the invention comprises at least one step of displacement of eluent by a compressed gas.

This displacement step may be performed, notably, after the elution step and before the regeneration step (displacement of the eluting eluent).

It may also be performed after the regeneration step and before the equilibration step (displacement of the regeneration eluent).

When the method does not comprise a regeneration step, the displacement step may be carried out after the elution step and before the equilibration step (displacement of the eluting eluent).

In a preferred embodiment, a regeneration step is present, and two displacement steps are provided: one after elution and before regeneration (displacement of the eluting eluent); and the other after regeneration and before equilibration (displacement of the regeneration eluent).

Figure 2:
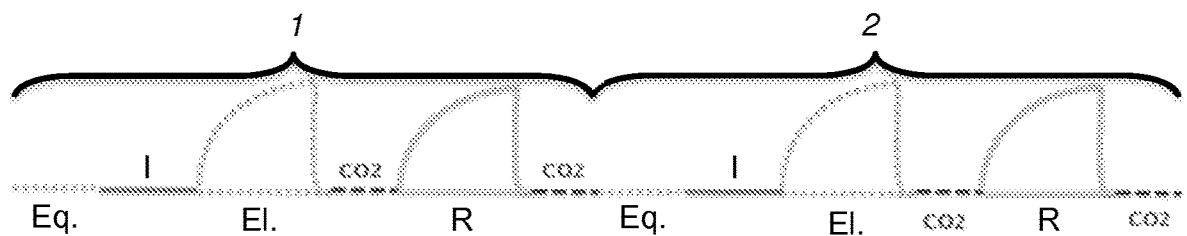
FIG. 2 very schematically shows a succession of steps in a method according to the invention.

This embodiment is illustrated in FIG. 2, which shows schematically the displacement of eluents in the case where the compressed gas is $CO_2$: two cycles (1 and 2) are represented. Each cycle comprises successively: an equilibration step (Eq.), a product injection step (I), a step of eluting the slightly retained impurities and the product (EI.), An eluent displacement step by $CO_2$, a regeneration step, namely desorption of highly retained impurities (R), and finally another displacement step of the solvents by $CO_2$.

According to one embodiment, all the steps of the method are carried out substantially at the same pressure. According to an alternative embodiment, the pressure differs from one step to another. Notably, it may be higher in the eluent displacement steps by means of the compressed gas.

At the end of each eluent displacement step, preferably at least 95% by weight, more preferably at least 99% by weight, or at least 99.5% by weight, or at least 99.9% by weight, or at least 99.95% by weight, or at least 99.99% by weight of the eluent initially in contact with the stationary phase, is removed.

During the eluent displacement step, an output stream is collected at the output of the stationary phase. Preferably, at the end of the displacement step, the content of eluent in the outlet stream is less than or equal to 5% by weight, more preferably less than or equal to 0.1% by weight, or less than or equal to at 0.5% by weight, or less than or equal to 0.1% by weight, or less than or equal to 0.05% by weight, or less than or equal to 0.01% by weight.

The stationary phase is generally present as a bed in an enclosure, which, in general, is in the form of a column.

The chromatographic separation according to the invention may thus be implemented either in a single-column chromatography system or in a multi-column chromatography system.

It may be a chromatography system with static bed or not. In a static bed chromatography system, the mixture of compounds to be separated percolates in an enclosure or column, which is generally cylindrical. The column contains a bed of porous material (the stationary phase) that is permeable to fluids. The rate of percolation of each compound in the mixture depends on the physical properties of the compound. The compounds most retained on the stationary phase percolate more slowly than the compounds least retained on the stationary phase. This principle makes it possible to perform the desired separation.

It is possible to perform such treatment in several columns in series or in parallel, but generally a chromatographic separation in a static bed system is implemented with a single column.

Examples of such static bed chromatography systems are HPLC (High Performance Liquid Chromatography) or CYCLOJET™ systems (i.e. stationary recycling system).

The CYCLOJET™ system is as described in document U.S. Pat. No. 6,063,284, to which reference is expressly made. It is a discontinuous chromatography separation system with a single column, in which the (i) most retained and then the (ii) least retained species are collected separately at the outlet of the column, wherein a non-separated portion of the chromatogram is recycled by a main pump. The mixture to be separated is periodically injected into the recycled portion of the chromatogram by means of an injection loop. The injection loop is preferably connected between the main pump and the column. After several chromatographic cycles, the method reaches a periodic steady state in which the quantity of products injected is equal to the quantity of products collected separately at the outlet of the column.

According to one embodiment, the chromatographic separation in a single-column static bed system with stationary recycling, is cyclic and comprises the following steps:

establishment and maintenance of a chromatographic profile circulating in the column by means of an eluent pump;

injection into said circulating chromatographic profile of a sample comprising the at least two compounds to be separated, in a discontinuous manner and at each cycle, the injection being carried out in an injection position by an injection valve by means of a controlled injection loop, in order to inject the sample present in the loop into the circulating chromatographic profile, while the injection valve remains in the injection position from the beginning of the injection until the moment when the entire profile is eluted from the column, then tilting the injection valve to a charging position in order to charge the injection loop when the entire profile is in the column, and collection of at least two fractions enriched from the circulating profile, in a discontinuous and periodic manner.

This separation may also include the following step:

passage of eluent in the column as a mobile phase, substantially continuously during the cycle, by means of the eluent pump.

This separation may also include the following steps:

recording events occurring from the beginning of the collection of a first fraction to the next beginning of the collection of the first fraction;

interruption of the eluent pump during the collection of a third fraction, wherein this interruption continues until the end of the cycle, so that the cycles are temporally reproducible.

According to one embodiment, there is no loss of circulating profile during injection in the maintained circulating profile.

A detailed embodiment of this system may be found in col. 5 1.36 to col. 10 1.41 of document U.S. Pat. No. 6,063,284 cited above.

The chromatographic separation unit may also be a non-static bed chromatography system. A non-static bed system is a multi-column system in which the relative positions of the stationary phase bed and injection and/or flow collection points are displaced over time.

Examples of such non-static bed chromatography systems are SMB, iSMB, SSMB, AMB, VARICOL™, MODICON™, POWERFEED™, DCC or MCSGP.

An SMB system comprises a plurality of individual adsorbent-containing columns, which are connected in series. An eluent stream flows through the columns in a first direction. The injection points of the feed stream and the eluent, as well as the collection points of the separated compounds, are periodically and simultaneously offset by means of a set of valves. The overall effect is to simulate the operation of a single column containing a moving bed of solid adsorbent, wherein the solid adsorbent moves in a countercurrent direction to the eluent stream. Thus, an SMB system is composed of columns that contain stationary beds of solid adsorbent through which the eluent passes, but the operation is such that a continuous countercurrent moving bed is simulated.

The most conventional form of an SMB system is the four-zone SMB system. Other possible forms are three-zone SMB systems and two-zone SMB systems (as described in Kwangnam Lee's article "*Two Section Simulated Moving Bed Process*" in Separation Science and Technology 35(4): 519-534, 2000, which is expressly referred to).

An iSMB system is as described in documents EP 0342629 and U.S. Pat. No. 5,064,539, to which reference is expressly made. An SSMB system cuts the introductions and collection of flows in sub-sequences applied in periodic ways. In the iSMB and SSMB systems, there is at least one step in which the system operates in a closed loop, without product input or output.

Other variants of the SMB systems are: the time-varying SMB system and the POWERFEED™ system, as described in document U.S. Pat. No. 5,102,553 and in the article "*PowerFeed operation of simulated moving bed units: changing flow-rates during the switching interval*", by Zhang et al. in Journal of Chromatography A, 1006:87-99, 2003, which is expressly referred to; the MODICON™ system, as described in document U.S. Pat. No. 7,479,228, to which reference is expressly made; and the SMB system with internal recirculation, as described in document U.S. Pat. No. 8,282,831, to which reference is expressly made.

A DCC chromatography system is as described in document FR 2889077, to which reference is expressly made. A DCC system is a sequential method with periodic displacement of the injection points of mobile phase and of mixtures to be separated, having the characteristic of being constantly open loop. It uses two or more columns.

An AMB system has a similar operation to an SMB system. However, instead of displacing injection points of the feed stream and eluent, as well as collection points, by means of a valve system, a set of adsorption units (columns) are physically displaced relative to the feeding and collection points. Again, the operation simulates a continuous countercurrent moving bed.

A VARICOL™ chromatography system is as described in documents U.S. Pat. Nos. 6,136,198, 6,375,839, 6,413,419 and 6,712,973, to which reference is expressly made. A VARICOL™ system comprises a plurality of individual adsorbent-containing columns that are connected in series. An eluent is passed through the columns in a first direction. Unlike the SMB system, the injection points for the mixture to be separated and for the eluent and the collection points of the separated compounds in the system are displaced periodically but asynchronously, by means of a set of valves. The overall effect is to create separation zones of variable length over time, thus dynamically allocating the stationary phase in the zones where it is most useful, and allowing similar separation power with fewer chromatography separation units and increased productivity. Unlike an SMB system, a VARICOL™ system does not simulate the operation of a single column containing a solid adsorbent moving bed, wherein the solid adsorbent moves in a countercurrent direction to the eluent stream, and so the operating principle of VARICOL™ cannot be implemented in an equivalent AMB system.

All of the above known installations may be adapted for implementing the method according to the invention, by providing adequate supplies for the enclosure(s) containing the stationary phase bed, namely:
  at least one eluent supply as described above, preferably several eluent supplies (notably an eluting eluent supply and a regeneration eluent supply); and
  at least one compressed gas supply, for the step(s) of eluent displacement by the compressed gas.

The installation of the invention also advantageously comprises a device for separating compressed gas and solvent at the outlet of the enclosure(s) or column(s).

This separation device may, notably, comprise a cyclonic separator, a filter and/or an evaporator.

Thus, the method of the invention advantageously comprises a collection of a mixture of compressed gas and one or more solvents during the step of displacement of the eluent by the compressed gas, and the separation of the compressed gas on the one hand and solvent(s) on the other hand. Thus, the compressed gas may be recycled notably for the implementation of the displacement step(s)). Similarly the solvent or solvents may be recycled (notably to reconstitute an eluent).

The stationary phase of the invention comprises at least one material chosen from activated alumina, silica gel, activated charcoal, silicic acid, magnesium oxide, calcium hydroxide magnesium hydroxide, cellulose, amylose, a polymerized adsorbent, a derivative thereof, and/or combinations thereof.

The chromatographic separation of the invention may be in the normal phase, i.e. based on polar interactions between the species to be separated and the stationary phase. The stationary phase is then polar in nature, for example a silica phase, functionalized or not.

Alternatively, the chromatographic separation of the invention may be in reverse phase, i.e. based on hydrophobic interactions between the species to be separated and the stationary phase. The stationary phase is then non-polar in nature, for example a silica phase on which hydrocarbon chains are grafted.

Alternatively, the chromatographic separation of the invention may employ a stationary phase of intermediate polarity.

Alternatively, the chromatographic separation of the invention may be a chiral separation. In this case, the stationary phase comprises chiral molecules grafted on a support (for example silica).

The invention may, in particular, be implemented for the separation of non-polar products, preferably on a normal stationary phase. In this case, the product of interest and the impurities engage with the stationary phase non-covalent hydrophilic interactions, notably hydrogen type bonds.

The eluting power of each eluent is, therefore, even stronger when the solvent(s) which constitute it, is or are polar. The product of interest, hydrophobic, is weakly retained on the stationary phase.

Thus, an alkane, or mixture of alkanes, or a mixture of alkane(s) and compressed gas, may be used for the elution step (and for equilibration).

For regeneration, a polar solvent such as ethyl acetate is preferably used to desorb the impurities strongly bound to the stationary phase.

Figure 3:
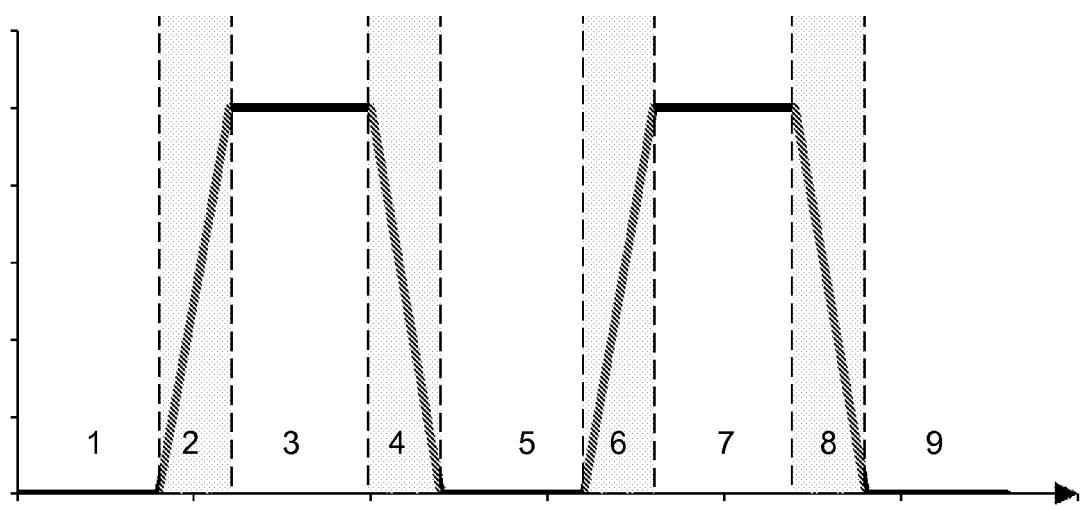
FIG. 3 very schematically shows a succession of steps in a preferred embodiment of the invention (with a compressed gas content in the output stream of the chromatographic column on the ordinate, and a duration on the abscissa).

FIG. 3 schematically shows such a method, wherein the graph represents the evolution of the rate of compressed gas in the output stream of a chromatographic column (ordinate) as a function of time.

Phase 1 corresponds to the elution step. The output stream of the column is the eluting eluent, for example an alkane. Phases 2 and 3 correspond to the displacement of the eluting eluent by the compressed gas. The rate of compressed gas in the output stream increases in phase 2 until it reaches a maximum, then remains in a plateau in phase 3. Phases 4 and 5 correspond to the regeneration step, in which a regeneration eluent, for example ethyl acetate, is injected. The rate of compressed gas in the output stream decreases in phase 4 to zero, then remains at zero in phase 5. Phases 6 and 7 correspond to the displacement of the regeneration eluent by the compressed gas. The compressed gas content in the output stream increases in phase 6 until it reaches a maximum, then remains in a plateau in phase 7. Phases 8 and 9 correspond to the equilibration step, in which an equilibration eluent, again for example an alkane, is injected. The compressed gas content in the output stream decreases in phase 8 to zero, then remains at zero in phase 9.

The products of interest to be separated or purified may be, in particular, natural extracts, carotenes, squalenes, vitamins, peptides, insulin (preferably recombinant insulin) or an insulin derivative.

The invention claimed is:

1. A method for chromatographic separation, comprising at least one step of eluting species retained on a stationary phase by means of an eluent, followed by a step of displacing the eluent in contact with the stationary phase by means of a compressed gas, wherein the compressed gas is in a liquid state or a supercritical state.

2. The method of claim 1, wherein the eluent is a single compound.

3. The method of claim 1, wherein the eluent is a mixture of at least two compounds.

4. The method of claim 1, wherein the eluent is an aqueous and/or organic solvent, or a mixture of aqueous and/or organic solvents.

5. The method of claim 1, wherein the eluent is a mixture of aqueous and/or organic solvent(s) and compressed gas.

6. The method of claim 1, comprising, after the step of displacing the eluent, collection of a mixture of compressed gas and aqueous and/or organic solvent(s) at the output of the stationary phase, and separation of the compressed gas and the aqueous and/or organic solvent(s).

7. The method of claim 6, wherein the aqueous and/or organic solvent(s) are recycled.

8. The method of claim 6, wherein the compressed gas is recycled.

9. The method of claim 1, wherein the step of eluting species retained on a stationary phase by means of an eluent is an elution step of product(s) of interest.

10. The method of claim 1, wherein the step of eluting species retained on a stationary phase by means of an eluent is a step of regeneration of the stationary phase.

11. The method of claim 1, wherein the eluent is a first eluent, and the method comprises, after the step of displacing the eluent by means of a compressed gas, bringing into contact a second eluent with the stationary phase.

12. The method claim 11, wherein bringing into contact a second eluent with the stationary phase is a step of regeneration of the stationary phase.

13. The method claim 11, wherein bringing into contact a second eluent with the stationary phase is an equilibration step.

14. The method of claim 1, which comprises, cyclically:
an equilibration step, comprising bringing an equilibration eluent into contact with the stationary phase;
an injection step comprising bringing a composition comprising a product to be separated into contact with the stationary phase;
an optional rinsing step, comprising bringing a rinsing eluent into contact with the stationary phase;
a step of eluting the product, comprising bringing an eluting eluent into contact with the stationary phase and collecting the product to be separated;
again, the equilibration step;
and wherein the step of displacing eluent in contact with the stationary phase by means of a compressed gas is performed between the product elution step and the equilibration step.

15. The method of claim 1, which comprises, successively or cyclically:
an equilibration step, comprising bringing an equilibration eluent into contact with the stationary phase;
an injection step comprising bringing a composition comprising a product to be separated into contact with the stationary phase;
an optional rinsing step, comprising bringing a rinsing eluent into contact with the stationary phase;
a step of eluting the product, comprising bringing an eluting eluent into contact with the stationary phase and collecting the product to be separated;
a regeneration step, comprising bringing a regeneration eluent into contact with the stationary phase;
if applicable, the equilibration step again;
wherein the method comprises at least one displacement step of an eluent in contact with the stationary phase by means of a compressed gas, between the product elution step and the regeneration step; and/or between the regeneration step and the equilibration step.

16. The method of claim 15, which comprises both a displacement step of an eluent in contact with the stationary phase by means of a compressed gas between the product elution step and the regeneration step, and another displacement step of an eluent in contact with the stationary phase by means of a compressed gas between the regeneration step and the equilibration step.

17. The method of claim 14, wherein the steps of equilibration, injection, optional rinsing, elution, and optional regeneration, are implemented with eluents comprising a compressed gas.

18. The method of claim 14, wherein the steps of equilibration, injection, optional rinsing, elution, and optional regeneration, are implemented with eluents not comprising a compressed gas.

19. The method of claim 1, wherein the stationary phase comprises at least one material selected from the group consisting of activated alumina, silica gel, activated carbon, silicic acid, magnesium oxide, calcium hydroxide, magnesium hydroxide, cellulose, amylose, a polymerized adsorbent, a derivative thereof, and combinations thereof.

* * * * *

UNITED STATES PATENT AND TRADEMARK OFFICE
CERTIFICATE OF CORRECTION

Page 1 of 1

PATENT NO. : 11,154,795 B2
APPLICATION NO. : 16/340041
DATED : October 26, 2021
INVENTOR(S) : Boni It is certified that error appears in the above-identified patent and that said Letters Patent is hereby corrected as shown below:

In the Claims

In Claim 12, Column 13, Line 41, delete "method claim 11," and insert -- method of claim 11, --.

In Claim 13, Column 13, Line 44, delete "method claim 11," and insert -- method of claim 11, --.

Signed and Sealed this
First Day of March, 2022

Drew Hirshfeld
*Performing the Functions and Duties of the
Under Secretary of Commerce for Intellectual Property and
Director of the United States Patent and Trademark Office*